Figure 1:
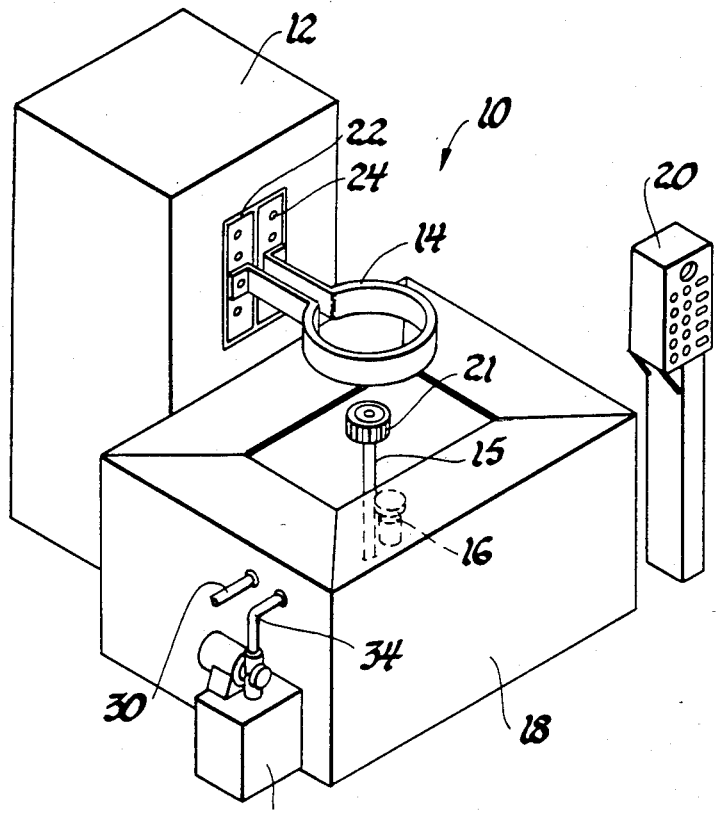

United States Patent [19]

Chatterjee

[11] Patent Number: 4,639,279
[45] Date of Patent: Jan. 27, 1987

[54] SINGLE FREQUENCY INDUCTION HARDENING PROCESS

[75] Inventor: Madhu S. Chatterjee, Carmel, Ind.

[73] Assignee: General Motors Corporation, Detroit, Mich.

[21] Appl. No.: 797,707

[22] Filed: Nov. 13, 1985

[51] Int. Cl.⁴ .............................................. C21D 9/24
[52] U.S. Cl. .................................. 148/147; 29/159.2; 148/150; 219/10.59
[58] Field of Search ............... 29/159.2; 148/147, 150; 219/10.59

[56] References Cited
U.S. PATENT DOCUMENTS 2,446,202  8/1948  Vang ................................. 219/10.59
3,196,244  7/1965  Wulf ................................. 219/10.59

OTHER PUBLICATIONS

*Metals Handbook*, 9th Edition, vol. 4, "Heat Treating-Induction Hardening and Tempering", pp. 451–483.

Primary Examiner—Howard N. Goldberg
Assistant Examiner—P. W. Echols
Attorney, Agent, or Firm—Mark A. Navarre

[57] ABSTRACT

The teeth and roots of a gear are contour hardened by induction at a single work station with a single solid state power supply. The inductor or coil is full-faced and encircles the gear during the preheat and final heat steps of the process. The power supply energizes the inductor with alternating current of a single frequency in the general range of 50–100 kHz according to a predetermined schedule of on-time and power level. The supply of current to the inductor is such that the time required for the supplied power level to achieve the scheduled power level in the final heat step is no more than approximately one-third of the scheduled final heat time.

2 Claims, 5 Drawing Figures

SINGLE FREQUENCY INDUCTION HARDENING PROCESS

This invention relates to induction hardening and more particularly to a process for contour hardening the teeth and roots of a gear.

BACKGROUND OF THE INVENTION

In the manufacture of heavy duty gears, it is generally necessary to harden the tooth and root surfaces by a heat treating process to improve their wear resistance. For best results, the depth of hardening (case) should be limited, since through hardening of the teeth produces internal stresses that may result in cracking. Gears so treated are said to be contour hardened since the hardened region follows the contour of the gear.

To harden gears by induction, a work coil (inductor) is brought in close proximity to the gear and energized with alternating current. The coil is energized at a predetermined frequency and power level for a predetermined time to achieve the desired heating, whereafter the gear is quenched to produce the desired hardness. The frequency, power level and time parameters are interrelated and chosen for a given application in relation to the size of the gear and the required case depth. Due to a phenomenon known as skin effect, the depth of heating varies inversely with the frequency at which the coil is energized. Time of heating relates to the phenomenon of conduction within the workpiece. Due to the phenomenon of conduction, surface heat rapidly progresses to the core of the gear, thereby increasing the depth of heating with increasing time of heating. The coil power density is related to the coil size and the power level applied to the coil, and directly affects the amount of localized heating.

Broadly, there are two different techniques for hardening gears by induction: scanning and single shot. In the scanning technique, the coil spans only a portion of the gear, and either the coil or gear is moved relative to the other so that the coil is passed along the width of one or more gear teeth. After quenching the heated teeth, the gear or coil is then indexed, and the process repeated until the entire gear has been hardened. In the single shot technique, all of the gear teeth are heated concurrently by a coil which surrounds the gear. After the heating is completed, the teeth are concurrently quenched. Of the two techniques, single shot has the advantages of being significantly faster to perform, and less likely to result in distortion and overheating of the gear edges.

Presently known single shot induction hardening techniques require two frequencies of coil energization and comprise four steps: preheat, dwell, final heat, and quench. In the preheat step, the gear is positioned relative to a first inductor, which inductor is energized for a predetermined interval at a relatively low frequency and power level to heat the teeth and roots to a predetermined temperature. In the dwell step, the heating is interrupted for a predetermined interval during which the the tips of the gear teeth are allowed to cool in preparation for final heating. Depending on the pitch of the gear teeth, the dwell step may be minimized or eliminated entirely. In the final heat step, the gear is positioned relative to a second inductor, which inductor is energized for a predetermined interval at a relatively high frequency and power level to produce a very localized surface heating of the teeth and roots. In the fourth step, the gear is quenched. In any given application, the preheat and dwell intervals are selected to heat the roots and tips of the gear to desired temperatures, and the final heat interval is selected such that both the tips and roots are at uniform higher temperature at the time of quenching. In a typical application, the preheat step is carried out with a solid state power supply operating at a frequency of 1-10 kHz and a power level of about 30 kW for a period of 30-35 seconds, while the final heat step is carried out with a vacuum tube oscillator power supply operating at a radio frequency (rf) such as 450 kHz and a power level of 350 kW for a period of 0.4-2.0 seconds, depending on the gear pitch. Such known single shot technique has been successfully used to contour harden gears, but has the disadvantage of requiring different power supplies and work stations for carrying out the preheat and final heat steps.

SUMMARY OF THE INVENTION

The present invention is directed to an improved single shot process for contour hardening gear teeth by induction, wherein both the preheat and final heat steps are carried out at one work station with a single solid state power supply operating at a single frequency. In a mechanization of the embodiment illustrated herein, successful contour hardening of gears was achieved at a single frequency of 50 kHz, using a power level of 30 kW during preheat and 250 kW during final heat.

The advance in the art of contour hardening gears by induction as outlined above is made possible through the inventive recognition herein of a fourth critical heating parameter, ramp time, and its relation to the final heat interval. The term ramp time, as used hereinafter, refers to the time required for the power supply to reach its required power output level at the initiation of a heating period. Solid state power supplies used in known single shot induction hardening applications typically have ramp times of 1.0 second or more when used to energize a coil at a high frequency such as 50-100 kHz. If the final heat interval is only 0.4-2.0 seconds, all or nearly all of the heating may occur before the power level required to achieve the desired surface temperature is achieved. As a result, the gear is not uniformly heated and the teeth become through hardened due to conduction. In essence, I have found that if the ramp time represents no more than one-third of the final heat interval, the non-uniform heating and through hardening is avoided, and the gear teeth can be contour hardened with one solid state power supply operating at a single intermediate frequency in the range of 50-100 kHz.

In accordance with a further aspect of this invention, the coil used in the hardening process is full faced and wider than the profile of the gear. As a result, the concentration of magnetic field lines at the edges of the gear teeth is reduced, thereby avoiding overheating of the gear edges. This effect is enhanced by virtue of the fact that both faces of the gear are exposed to air, in that the heat transferred to the faces of the gear through conduction from the core is transferred both to the air and the center of the teeth.

IN THE DRAWINGS

FIG. 1 is schematic diagram depicting an exemplary work station for carrying out the single shot hardening method of this invention.

Figure 2:
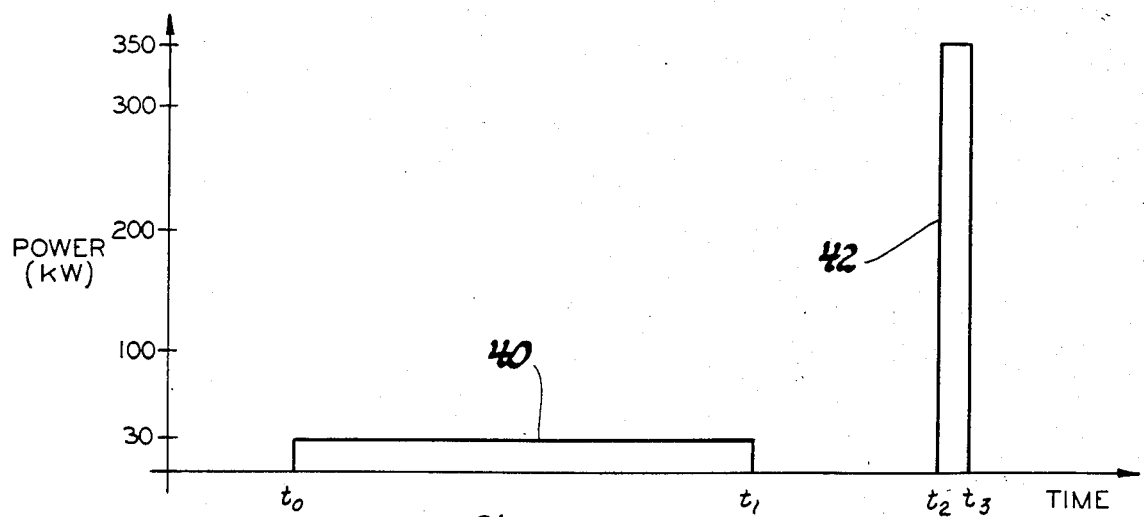
Figure 3:
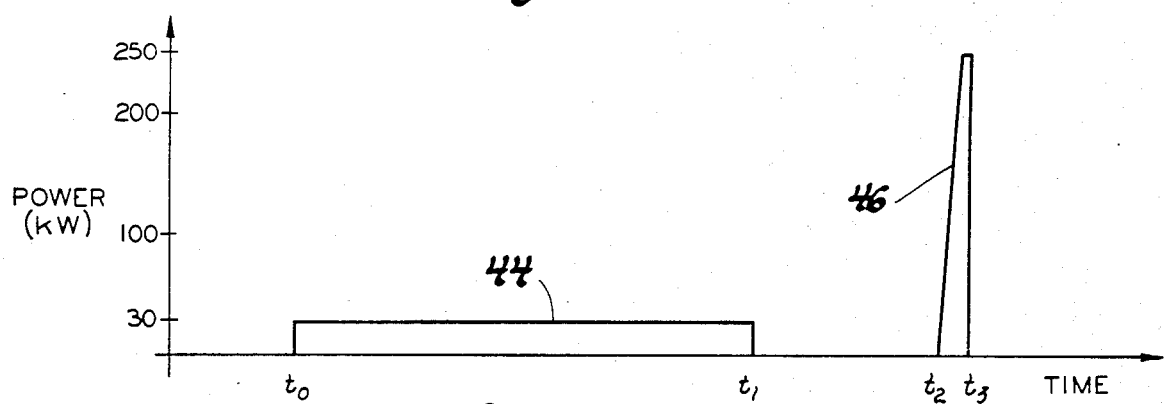
Figure 4:
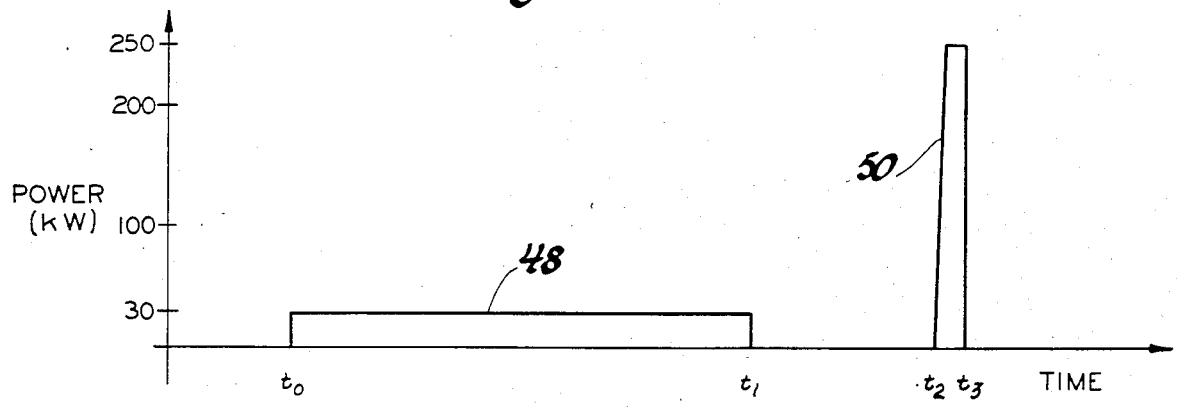

FIGS. 2-4 graphically depict the heating steps of different single shot hardening methods.

Figure 5:
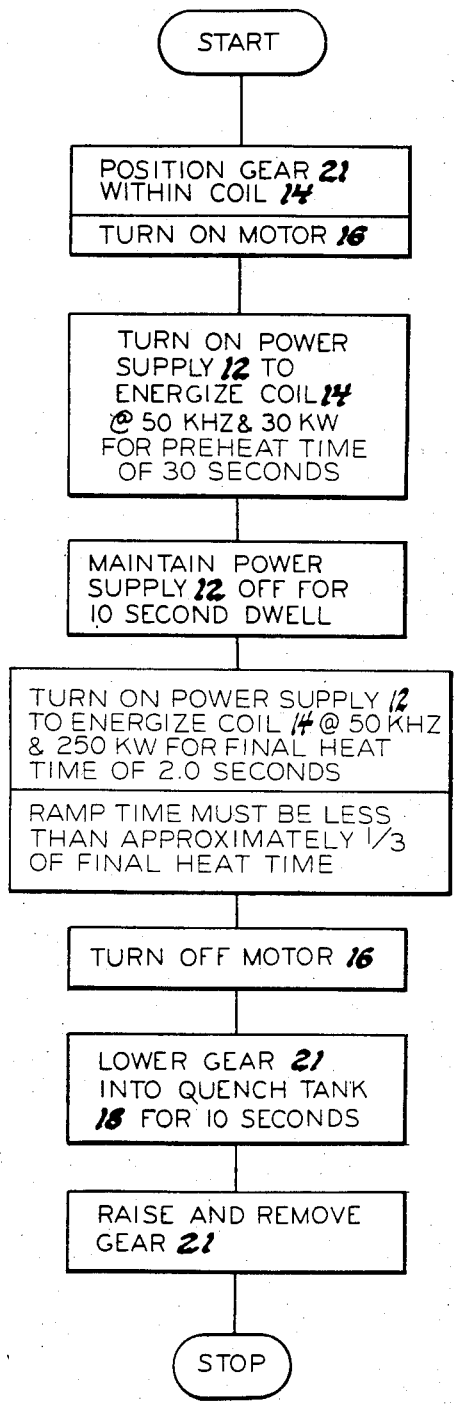

FIG. 5 is a flow diagram representative of the steps performed by the work station of FIG. 1 in carrying out the hardening method of this invention.

Referring now to the drawings, and more particularly to FIG. 1, the reference numeral 10 generally designates a single shot inductive hardening work station comprising a solid state power supply 12, a coil 14, a pedestal 15, an electric motor 16 for rotating the pedestal 15 during the heating steps, a quench tank 18, and a control panel 20 for controlling the hardening process. The gear 21 to be hardened is mounted on the pedestal 15 as shown. The coil 14 is positioned over the quench tank 18, and is electrically connected to the output terminals 22 and 24 of power supply 12. Quench tank 18 is filled with a soluble polymer or other suitable quenchant via the line 30. The pedestal 15 is positioned at the center of the coil 14, and is supported by a hydraulic cylinder (not shown) mounted in the bottom of the quench tank 18. The hydraulic cylinder is supplied with hydraulic fluid from the pump 32 via line 34 and is selectively controllable to raise the pedestal 15 for positioning the gear 21 relative to the coil 14 during the heating steps of the process, or to lower the pedestal 15 and gear 21 into the quench tank 18 during the quench step of the process. The control panel 20 is adapted to receive command information from a work station operator relating to the various steps of the hardening process, and to transmit suitable output signals to the power supply 12, the electric motor 16, and the hydraulic pump 32. The signals transmitted to the pump 32 control the height of the pedestal 15, the signals transmitted to the electric motor 16 control the rotation of pedestal 15 and gear 21, and the signals transmitted to the power supply 12 control its power output and on-time The solid state power supply 12 is adapted to supply coil 14 with 50 kHz alternating current at a variable power level of up to 250 kW in accordance with the output signals of control panel 20. In addition, power supply 12 is designed so as to reach its rated power output of 250 kW in a minimum amount of time. In the illustrated embodiment, the power supply 12 is capable of reaching its maximum power level of 250 kW within approximately 0.67 seconds. Power supplies capable of meeting the above specifications are manufactured by and commercially available from PPS Manufacturing Inc., Santa Clara, California, among others.

The coil 14 is an encircling full faced design, and is sized in relation to the gear such that it extends beyond both faces of the gear. In a mechanization of the illustrated embodiment where the gear width was 1.00 inch (2.54 cm), the width of coil 14 was 1.25 inch (3.175 cm), and the coils extended beyond the faces of the gear by 0.125 inch (0.3175 cm).

FIG. 2 depicts the heating steps of the known single shot hardening method wherein the preheat and final heat steps are carried out at different frequencies. The preheat step occurs between times $t_0$ and $t_1$ and is represented by the trace 40; the final heat step occurs between times $t_2$ and $t_3$ and is represented by the trace 42. The preheat step is typically carried out with a solid state low frequency power supply by energizing the coil at a frequency of 1–10 kHz and a power level of about 30 kW. The final heat step is typically carried out with a vacuum tube oscillator power supply by energizing the coil at a frequency of about 450 kHz and a power level of 350 kW. Although vacuum tube oscillator power supplies are generally undesirable from efficiency and cost standpoints, solid state power supplies generally cannot supply the frequency and power level typically used for the final heat step. At time $t_0$, the low frequency solid state power supply is turned on, and the preheat power level of 30 kW is reached in a relatively short time. At time $t_1$, the low frequency power supply is turned off, marking the beginning of the dwell step. The dwell interval $(t_2-t_1)$ is determined in relation to the gear geometry as indicated above and is typically in the range of 1–15 seconds. At time $t_2$, the high frequency vacuum tube oscillator power supply is turned on. Characteristically, its power output rises almost instantaneously to the desired final heat power level of 350 kW. It is maintained on for a predetermined interval—2.0 seconds in the illustrated embodiment—and then turned off at time $t_3$.

Despite the potential advantages of the known single shot hardening method, it has not been widely used in industry due to the power supply and cost related disadvantages set forth above in reference to FIG. 2. However, such disadvantages are overcome by the hardening method of this invention, which has been used to successfully contour harden gears using only a single power supply operating at an intermediate frequency in the range of 50 kW to 100 kW. Such frequency is within the operating range of conventional solid state power supplies. Crucial to the invention, however, is the recognition that the power supply must be designed to achieve its rated power output in a minimum amount of time. In particular, it is recognized herein that the ramp time required to achieve the desired final heat power level should be no more than one-third of the desired final heat interval. If this requirement is met, the ramp time in the preheat step will be acceptable as well. In the past, solid state power supplies used in induction hardening applications have not been designed to minimize the ramp time. The technology is and has been available to do so, but the need for minimum ramp time in induction hardening applications has not heretofore been recognized. As indicated above, solid state power supplies capable of meeting the specifications set forth herein may be obtained from industrial power supply manufacturers, including PPS Manufacturing Inc., identified above. Moreover, the future availability of solid state power supplies meeting the power and ramp time specifications is expected to significantly increase due to the recent availability of high speed semiconductor power devices.

Early unsuccessful experiments leading to the present invention were carried out with a solid state power supply of the variety typically used in known induction hardening processes. The heating steps used in those experiments are graphically depicted in FIG. 3, wherein the preheat step is represented by the trace 44, and the final heat step is represented by the trace 46. Whereas the final heat step for the particular application would normally require 2.0 seconds at 250 kW to achieve the desired heating prior to quenching, only 0.6 second of the heating interval was performed at 250 kW due to the 1.4 second ramp time of the power supply. Thus, the desired surface temperatures were not attained, and the gear was not hardened properly. Moreover, extending the heating interval in an attempt to compensate for the excessive ramp time resulted in overheating and through hardening of the teeth.

Successful contour hardening of gears was only achieved following the inventive recognition that the ramp time must be minimized and limited in relation to the final heat interval. The heating steps used to successfully contour harden a gear with a single frequency solid state power supply are graphically depicted in FIG. 4, wherein the preheat step is represented by the trace 48 and the final heat step is represented by the trace 50. The ramp time to 250 kw in the final heat step was reduced to approximately 0.67 seconds or less, which satisfied the requirement that the ramp time be no longer than one-third of the final heat interval of 2.0 seconds.

The control steps for performing the induction hardening process of this invention are set forth in the form of a flow diagram in FIG. 5. The flow diagram is consistent with the graphical representation described above in reference to FIG. 4, and may be manually or automatically carried out with a work station of the type shown and described in reference to FIG. 1. Thus, the process includes the steps of controlling the motor 16 and pump 32 to position and rotate the gear 21 within the coil 14; turning the power supply 12 on to energize the coil 14 with 50 kHz alternating current at 30 kW for 30 seconds (preheat); maintaining the power supply 12 off for 10 seconds (dwell); turning the power supply 12 on to energize the coil 14 with 50 kHz alternating current at 250 kW for 2.0 seconds (final heat); and controlling the pump 32 to lower the gear 21 into the quench tank (quench). If desired, the coil 14 may also be used to temper the gear following the quench operation.

Although this invention has been described in reference to the illustrated embodiment, various modifications will occur to those skilled in the art. For example, the coil itself may include an internal passage for conducting quenching liquid and a series of orifices between the passage and the inner periphery of the coil, so that the gear may be quenched in the final heat location. In addition, different power levels and heating intervals may be appropriate for the hardening of different types of gears. In such regard, it should be understood that processes incorporating these and other modifications may fall within the scope of this invention, which is defined by the appended claims.

The embodiments of the invention in which an exclusive property or privilege is claimed are defined as follows:

1. In a single shot process for contour hardening a gear by induction, the process including a preheat step during which the gear is positioned within an encircling coil and heated by supplying the coil with alternating current for a desired preheat interval at a preheat power level, and a final heat step during which the gear is maintained within the coil and further heated by supplying the coil with alternating current for a desired final heat interval at a final heat power level, the improvement wherein:
    the alternating current supplied to the coil in both the preheat and final heat steps is of a single frequency in the general range of 50 kHz–100 kHz, and the time required for the supplied power level to achieve the final heat power level in the final heat step is no more than approximately one-third of the desired final heat time.

2. A process for single shot contour hardening a gear by induction comprising the steps of:
    positioning the gear to be contour hardened within a full faced coil on the central axis thereof such that the coil extends beyond the gear faces along the direction of such axis;
    supplying the coil with alternating current of predetermined frequency in the general range of 50 kHz to 100 kHz and at a desired preheat power level for a desired preheat time to define a preheat step during which the gear teeth and roots are heated to an initial desired temperature;
    defining a dwell interval during which the coil is not supplied with current and tips of the gear teeth are permitted to cool to a somewhat lower temperature than the rest of the gear;
    supplying the coil with alternating current of said predetermined frequency at a desired final heat power level for a desired final heat time to define a final heat step during which the gear teeth and root surfaces are heated to a final desired temperature, the supply of alternating current during said final heat step being such that the time required to achieve the final heat power level is no more than approximately one-third of the desired final heat time; and
    quenching the gear to produce the desired depth of hardness.

* * * * *